Jan. 14, 1941.    J. E. KEPPEL    2,228,808
ANIMAL TRAP
Original Filed March 14, 1938
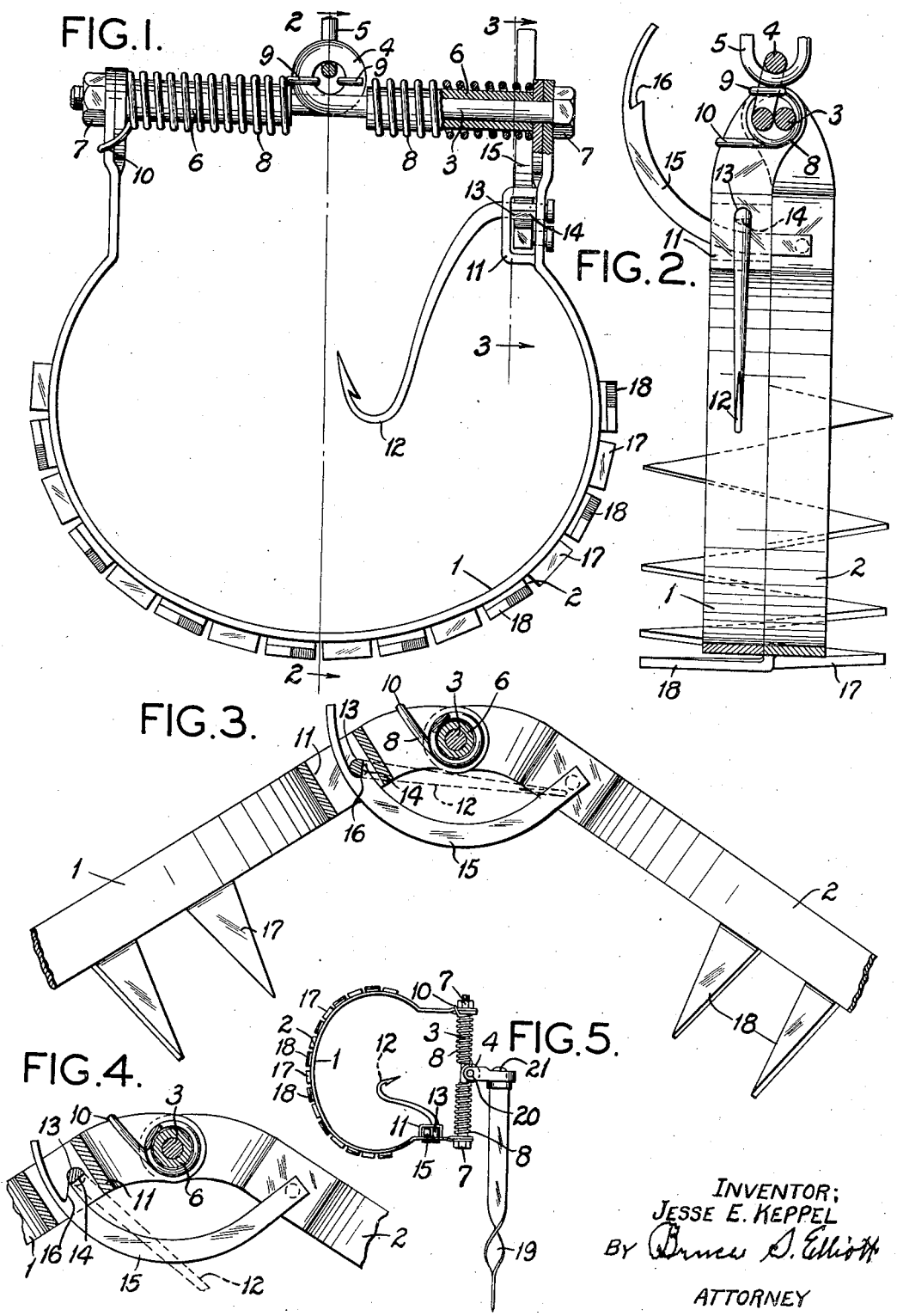
INVENTOR;
JESSE E. KEPPEL
By Bruce S. Elliott
ATTORNEY Patented Jan. 14, 1941

2,228,808

UNITED STATES PATENT OFFICE 2,228,808

ANIMAL TRAP

Jesse E. Keppel, Troy, Mo.; Werner Charles Hencke, Sr., and Mildred Entler administrators of said Jesse E. Keppel, deceased Application March 14, 1938, Serial No. 195,672
Renewed April 4, 1940

4 Claims. (Cl. 43—94)

The general object of my invention is to provide a trap for catching fur bearing animals which shall be simple and economical in construction, which may be easily set without danger of injury to the operator, and when set and anchored in position in the preferred manner will practically present no element of danger to persons passing near the trap who are unaware of its presence.

An important object of the invention also is to provide a trap of the spring-jaw type but which, unlike conventional traps of this character, when sprung in the contemplated manner by the animal will operate to kill the animal instead of gripping it by the leg and thus holding it until the trap is visited by the trapper and the animal killed.

There is a growing sentiment against the use of traps which are intended in operation to merely grip the leg of the animal springing the trap, as such animals are frequently held by the trap for three or four days without food or water while at the same time undergoing great suffering, before the trap is visited by the trapper.

Moreover, such traps are a source of great danger to hunters and others walking over territory where the traps are set, as they are usually concealed from view and are intended to be sprung by the animal treading on the trigger and releasing the jaws which, in the case of large traps, such as bear traps, are actuated by powerful springs. There are a large number of known cases where hunters, woodsmen and others have trod upon and been caught by such traps, and suffered great agony before being released by the trapper, or others, and in many cases freezing to death before the trap is visited.

In order to avoid the inhumane and dangerous conditions above set forth incident to trapping animals by spring-jaw traps, I have devised a trap of this character which is designed to be suspended at a given distance above the ground and to be sprung by the animal reaching up and gripping the bait with its teeth, thereby releasing the trigger. In order to kill the animal thus springing the trap, the inner edge of each jaw is provided with long teeth, the two sets of teeth being staggered with relation to each other, so that when the trap is sprung these teeth will pierce to a considerable depth the throat of the animal and almost certainly puncture the jugular vein, causing the animal to rapidly bleed to death.

In another form of the invention, the trap may be mounted on the top of a stake or earth anchor driven into the ground, with the jaws opening or closing in a horizontal plane. In either this or the suspended position the trap is at all times above the surface of the ground, and hence cannot be trod upon either by animals or human beings.

My improved trap comprises, essentially, a pair of jaws, preferably of part circular formation, pivotally mounted at their rear, or back, ends on a cross-bar, a coil spring surrounding said cross-bar and operatively connected with said jaws, and against the resistance of which said jaws are adapted to be opened, a bait holder, preferably in the form of a hook, and constituting the trigger of the trap, pivotally mounted on one jaw and a trigger detent, or catch, pivotally mounted on the other jaw, each of said jaws being provided on its inner edge with teeth of a length to extend well beyond the rear edge of the other jaw when the trap is closed, and having staggered relation to each other so as to interlock in the closed position of the jaws.

It is a feature of the invention that the bait holder, when the trap is open, or set, lies close to the coil spring at the back of the jaws, so that to seize the bait the animal's head will be inserted well within the circular path of movement of the jaws to insure that when the trap is sprung the long teeth will engage about and pierce the throat of the animal.

It is a further feature of the invention that the trigger, or bait holder, must be pulled outward, instead of being pressed inward, to spring the trap, which is an added feature of safety distinguishing my trap from all other spring-jaw traps of which I am aware.

The invention is illustrated in the accompanying drawing, in which—

Fig. 1 is a view in side elevation of the trap;

Fig. 2 is a sectional view, taken on the line 2—2 of Fig. 1 and viewed in the direction of the arrows;

Fig. 3 is a sectional view, taken on the line 3—3 of Fig. 1 and viewed in the direction of the arrows, but with the jaws of the trap opened;

Fig. 4 is a fragmentary view similar to Fig. 3, but showing the trigger turned out of engagement with the trigger catch to permit the jaws to snap together under the power of the actuating spring of the trap; and Fig. 5 is a view on a reduced scale, showing the trap in side elevation and pivotally mounted on the upper end of an earth anchor.

Referring now to the drawing, the numerals 1, 2, indicate, respectively, the two circular jaws of the trap, the opposite ends of which jaws are pivotally mounted on the outer end of a cross-bar 3 which is centrally curved upon itself to provide an eye 4 in which is secured the link 5 of a chain, by means of which the trap may be suspended in the position shown in Fig. 3 from, say, the limb of a tree. Mounted on each end portion of the cross-bar 3 is a sleeve 6, each of which extends from one side of eye 4 to the inner side of jaw 1. The ends of the cross-bar 3 are screw-threaded, and secured on each end of the cross-bar is a nut 7, each of which bears against the outer side of an end of jaw 2, the ends of the jaws being suitably bent to overlap and lie adjacent to each other on the cross-bar, as clearly shown at the right of Fig. 1. Encircling each of the sleeves 6 is a coil spring 8, the inner end 9 of which is engaged in one side of eye 4, and the outer ends 10 of which engage over the outer sides of the respective jaws 1 and 2, as shown by Figs. 1 and 2. The power of the springs is exerted to hold the jaws normally closed, as will be understood. One of the jaws—the jaw 1 as shown in the drawing—is provided on its inner side near its pivoted end with a small bearing housing 11, pivotally mounted in, and extending through which is the straight bearing portion provided at the inner end of the bait-holder or hook 12. The bearing portion of the bait-holder is indicated by 13, and is flattened at one side in the part thereof within the housing 11 as indicated at 14. Pivotally mounted at its outer end on the jaw 2 is a curved trigger-catch 15, which extends through the housing 11 under the bearing portion 13 of the bait-holder, and has its outer end reduced to provide a shoulder 16, which, when the jaws 1 and 2 are opened, is adapted to engage the flat side 14 formed on the bait-holder, or trigger 12. In the interest of economy of construction, I prefer to construct and mount the catch 15 in a manner to adapt it to act by gravity; but a spring-actuated, or any other form of trigger mechanism could be substituted for the gravity form of catch shown.

Each of the jaws 1, 2 is provided around its inner edge portion with a series of long teeth, 17, 18, respectively, which at their base are offset slightly from the outer face of the jaws and are staggered relative to each other, all as clearly shown in Figs. 1 and 2. The length of the jaws is such that when they are brought together, as shown by Fig. 2, the outer ends of the teeth on one jaw will extend well beyond the outer edge of the opposite jaw.

Observing Figs. 3 and 4, it will be seen that if an animal seizes the bait on hook 12, with the trap in the set position shown in Fig. 3, he will pull the hook outwardly, or downwardly, thereby turning the flat side 14 out of engagement with shoulder 16, thereby permitting the jaws to spring together and cause the teeth 17 and 18 to pierce the throat of the animal and cause its death.

To set the trap, the hook 12 is baited, the trap placed with its back on the ground and the jaws 1 and 2 forced apart when the trigger-catch 15 will drop into engagement with the flat side 14 of the hook and thus prevent the jaws from closing until the bait-hook is pulled outward, or downward, to release the catch.

In Fig. 5 I have shown a trap such as described above pivotally, or rotatably, mounted on the upper end of an earth auger 19. To this end I secure on the eye 4, or otherwise at the center of the cross-bar 3, a bearing 20, which is rotatably secured on top of the earth auger in any well known way, as by a bearing pin 21 at the upper end of the auger, on which the bearing 20 is operatively mounted. The operation of this arrangement is the same as described with the suspended form of trap, except that the jaws operate in a horizontal, instead of a vertical, plane, and the bait may be seized by the animal while in its normal walking, or standing, position.

In desert regions, there are often no trees from which the trap may be suspended, and the trap may accordingly be placed on the ground in the usual way. However, for reasons above pointed out, I advise against this manner of using the trap.

I claim:

1. An animal trap comprising a cross-bar, a pair of spring-actuated jaws pivotally mounted at their inner ends thereon, trigger mechanism, including a bait-holding trigger, for releasably holding said jaws in an open position, and operating to release said jaws by an outward pull on said trigger, and an eye formed centrally of said cross-bar for receiving the end of a chain for suspending the trap from an overhead support.

2. An animal trap comprising a cross-bar, a pair of spring actuated jaws pivotally mounted at their inner ends thereon, a bait-holding trigger having a bearing portion pivotally mounted on one of said jaws and provided with a flat side, and a trigger catch pivotally mounted on the other jaw and extending adjacent to and beyond said bearing portion, and a shoulder on said catch adapted to engage the flat side of said bearing portion and adapted to be released therefrom by pulling said trigger outward to turn the flat side of its bearing portion out of engagement with said shoulder.

3. An animal trap comprising a cross-bar, a pair of jaws pivotally mounted at their inner ends on opposite ends of said cross-bar, an eye formed centrally of said cross-bar, a pair of coil springs encircling said cross-bar each of which is secured at one end in said eye and at its other to one of said jaws, and trigger mechanism, including a bait holder, for releasably holding said jaws in an open position.

4. An animal trap comprising a cross bar, a pair of spring actuated jaws pivotally mounted at their inner ends thereon, trigger mechanism, including a bait-holder, for releasably holding said jaws in an open position, and means for anchoring the trap in a vertical position, with the jaws operating in a horizontal plane, comprising an earth-anchor and a bearing secured on said cross bar and rotatably mounted on the upper end of said earth-anchor.

JESSE E. KEPPEL.